Aug. 10, 1926.
F. G. THWAITS
1,595,633
COMPARTMENT TANK CONSTRUCTION
Filed Dec. 19, 1924
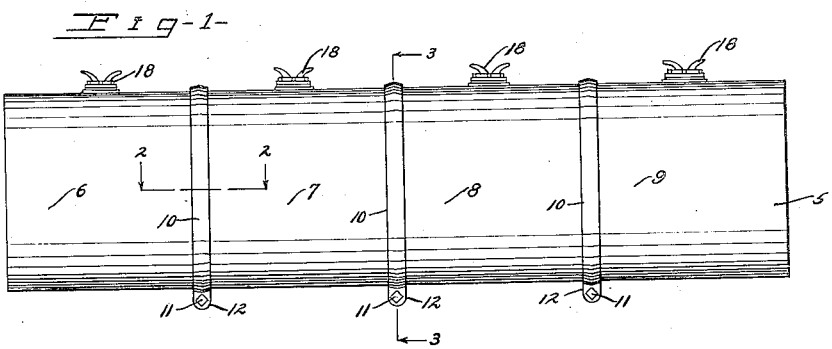
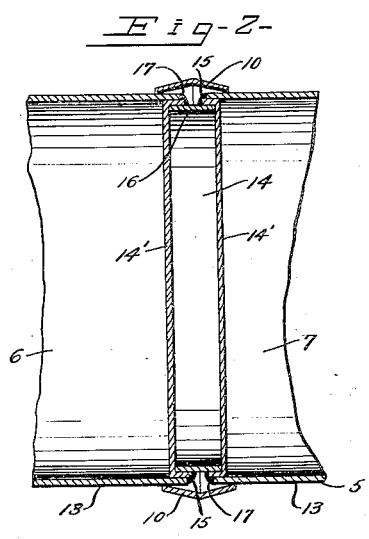
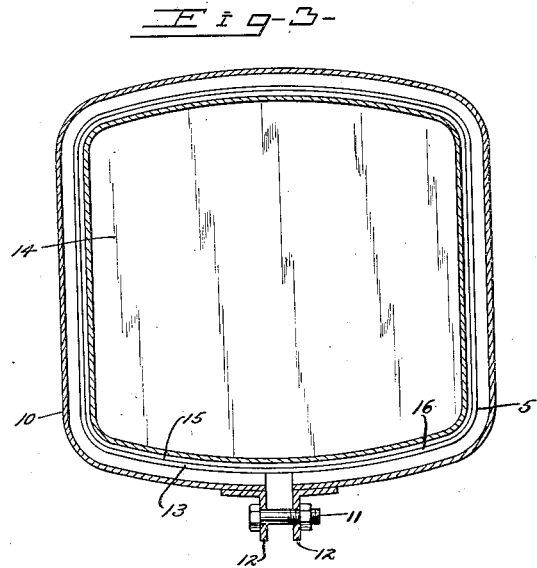
INVENTOR.
Frederick G. Thwaits
BY
Morsell, Keeney & Morsell
ATTORNEYS.

Patented Aug. 10, 1926.

1,595,633

UNITED STATES PATENT OFFICE.

FREDERICK G. THWAITS, OF WAUWATOSA, WISCONSIN, ASSIGNOR TO THE HEIL CO., OF MILWAUKEE, WISCONSIN, A CORPORATION OF WISCONSIN.

COMPARTMENT-TANK CONSTRUCTION.

Application filed December 19, 1924. Serial No. 756,982.

This invention relates to improvements in compartment tank construction for truck tanks more particularly adapted for dispensing gasoline, oils, etc.

Truck tanks more particularly adapted for dispensing gasoline, oils, etc. are usually divided into compartments for holding fluids of different kinds or qualities and each compartment is provided with a separate discharge means. Heretofore it has been the general practice to divide the tank into a number of compartments by inserting partitions within the tank and welding the edges of the partitions to the tank. This manner of forming the partitions has not been found very satisfactory due to the difficulty in welding the joints within the tank and also in making repairs in the event of leakage. Furthermore it is very difficult to locate a leak from one compartment to another and in repairing partitions it is necessary to remove other partitions to permit access to the parts needing repairs.

It is one of the objects of the present invention to overcome the before mentioned objectionable features and provide a compartment tank construction formed in sections with all of the partitions joints welded from the outside portion of the tank.

A further object of the invention is to provide a compartment tank construction in which each partition between the compartments is of double thickness and the peripheral edges of the compartments are also reinforced by double thicknesses of metal.

A further object of the invention is to provide a compartment tank construction in which the joints formed by the compartment heads are covered from view by an ornamental band which may be easily removed or replaced.

A further object of the invention is to provide a compartment tank construction which is of simple construction is strong and durable and is well adapted for the purpose described.

With the above and other objects in view the invention consists of the improved compartment tank construction and its parts and combinations as set forth in the claims, and all equivalents thereof.

In the accompanying drawing in which the same reference characters indicate the same parts in all of the views:

Fig. 1 is a side view of a tank provided with the improved compartment construction;

Fig. 2 is a sectional detail view taken on line 2—2 of Fig. 1 and on a larger scale; and Fig. 3 is a transverse sectional view on a larger scale taken on line 3—3 of Fig. 1.

Referring to the drawing the numeral 5 indicates a tank of the type used on tank trucks which is somewhat of rectangular form with rounded corners and top and bottom portions. The tank shown is divided into four compartments 6, 7, 8 and 9, and the joints connecting the compartments together are covered by metal bands 10 which are of angular form in cross section and are firmly clamped in position by bolts 11. The ends of the bands are positioned beneath the tanks and are provided with angular end portions 12 through which the bolts 11 extend.

Each compartment is formed of an outer tubular tank member 13 closed at its opposite ends by heads or partitions 14 and each partition is formed of two members 14' having flanges 15 extending towards each other which snugly fit the inner surface of the tank member but project outwardly therefrom a slight distance. A connector band 16 is of a shape to snugly fit within and engage the flanges of two adjacent head members. The connector band is of a length to space the edges of the flanges a short distance from each other so that a stepped formation is provided between the tank members, the flanges and the connector band as clearly shown in Fig. 2. The stepped edges of the tank members and the flanges are then welded to the connector band by lines of welding 17 as also shown in Fig. 2. This construction connects the compartments together with a double partition in which all of the joints are exposed to view so that in the event of a leak it will show exteriorly of the tank and it may be easily repaired by removing the bands 10 and then rewelding the part leaking. Furthermore the construction permits the use of smaller pieces of sheet metal and forms three thicknesses of metal at the edges of the tank members and reinforces said edges and the complete tank. Filling openings closed by caps 18 are provided for each compartment.

As many compartments or sections as desired may be connected together in the manner set forth to form the complete tank.

From the foregoing description it will be seen that the compartment tank construction is very simple and well adapted for the purpose described.

What I claim as my invention is:

1. A compartment tank construction, comprising tubular tank members positioned in spaced endwise relation, a partition member positioned between and extending into the ends of the tank members, and spaced lines of welding connecting the edge portions of the tank members to the partition member.

2. A compartment tank construction, comprising tubular tank members positioned in spaced endwise relation, a partition member of double thickness positioned between and extending into the ends of the tank members and spaced lines of welding connecting the edge portions of the tank members to the partition member in spaced relation.

3. A compartment tank construction, comprising tubular tank members positioned in spaced endwise relation, partition members extending into the adjacent ends of the tank members, a connector band positioned between and extending into the partition members, and spaced lines of welding connecting the edge portions of the tank members to the partition members and the partition members to the connector band.

4. A compartment tank construction, comprising tubular tank members positioned in spaced endwise relation, partition members extending into the end portions of the adjacent ends of the tubular members and having flange portions which project outwardly therefrom, a connector band interposed between the partition members and engaged by the flanges, and spaced lines of welding connecting the edge portions of the tubular tank members to the flanges and the flanges to the connector band.

5. A compartment tank construction, comprising tubular tank members positioned in spaced endwise relation, flanged partition members extending into the adjacent end portions of the tubular members with the flanged portions projecting outwardly beyond the edges of the tubular members, a connector band interposed between the partition members and snugly fitting the flanges to connect the two tubular tank members together and hold them in spaced relation, and exterior lines of welding connecting the edge portions of the tubular members to the flanges and the edge portions of the flanges to the connector band.

In testimony whereof, I affix my signature.

FREDERICK G. THWAITS.